United States Patent [19]

Belyakov et al.

[11] 4,356,132

[45] Oct. 26, 1982

[54] MASS-TRANSFER APPARATUS

[76] Inventors: Viktor P. Belyakov, prospekt Lenina, 5/1, kv. 62; Alexandr S. Bronshtein, ulitsa Bykovskogo, 10, kv. 19; Viktor S. Kortikov, ulitsa Bykovskogo, 2, kv. 63, all of Balashikha, U.S.S.R.

[21] Appl. No.: 273,776

[22] Filed: Jun. 15, 1981

[30] Foreign Application Priority Data

Dec. 26, 1977 [SU] U.S.S.R. .............................. 2558917

[51] Int. Cl.³ ................................................ B01F 3/04
[52] U.S. Cl. ........................ 261/114 TC; 261/114 JP; 261/114 R
[58] Field of Search ............... 261/113, 114 R, 114 JP, 261/114 TC

[56] References Cited

U.S. PATENT DOCUMENTS

| | | | |
|---|---|---|---|
| 2,116,933 | 5/1938 | Ragatz ................................. | 261/113 |
| 2,681,219 | 6/1954 | Thrift et al. ..................... | 261/114 JP |
| 4,051,206 | 9/1977 | Bunas et al. ..................... | 261/114 JP |
| 4,275,021 | 6/1981 | Kirkpatrick et al. .......... | 261/114 JP |

*Primary Examiner*—Gregory N. Clements
*Attorney, Agent, or Firm*—Steinberg & Raskin

[57] ABSTRACT

A mass-transfer apparatus comprises a vertical cylindrical housing, contact trays accommodated inside said housing and made up of perforated and non-perforated sectors, the neighboring trays being arranged so that the perforated sectors thereof overlie the non-perforated sectors and vice versa, overflow passageways of said contact trays positioned on said non-perforated sectors, overflow deflectors arranged on said contact trays, and baffles adapted to extend downwardly from each of said contact tray from the borderline between said perforated and non-perforated sectors and inclined towards said perforated sector.

5 Claims, 9 Drawing Figures

MASS-TRANSFER APPARATUS

FIELD OF THE INVENTION

The present invention relates to chemical engineering, and more particularly to improved constructions of tray-type mass-transfer apparatus.

The invention can find application in tray-type columns for carrying out the processes of rectification, distillation and absorption.

BACKGROUND ART

The present day chemical technology of the industrially developed countries widely utilizes tray-type apparatus for separating gas mixtures into constituents by virtue of the mass-transfer taking place between gas and liquid which come into contact on the tray surface. At relatively low volatility of the constituents, the height of mass-transfer apparatus may reach dozens of meters owing to the large number of trays required to effect a preset degree of separation of the initial mixture.

This poses the problem of providing novel types of tray columns having smaller dimensions and metal content as compared to the known prior art designs.

The prior art includes a large number of bubble tray constructions, the contact portion of which is fabricated from perforated sheet material or metal or caprone mesh and is disposed at the adjacent trays to overly one another. The distance between the trays of such a construction is determined by the thickness of the gas-liquid layer in the bubbling area and the height of the separation space above the layer of froth preventing the entrainment of the liquid towards the overlying tray.

The conventional trays described above suffer from a disadvantage residing in that it is impossible to substantially reduce the distance between the trays and, consequently, the overall height of the apparatus without affecting the efficiency of separation by the inter-tray entrainment of the liquid.

Also known is a tray-type apparatus for carrying out mass-transfer processes comprising a housing accommodating contact elements provided with deflectors in the form of plates with crimped vapour nozzles.

The apparatus features a rather low efficiency of gas-liquid separation in the inter-tray space.

Further known is a mass-transfer apparatus comprising a housing separated along the height thereof by contact trays made up of alternating perforated and non-perforated sectors.

Inherent in this construction is a disadvantage residing in that reduction of the inter-tray distance results in gas flow passing through a slot clearance above the flow deflector tending to throw liquid particles or drops entrained therewith against the perforations of the overlying segments which negatively affects the efficiency of the mass-transfer process.

SUMMARY OF THE INVENTION

It is an object of the invention to provide a construction of bubble trays modified in such a manner as to
(1) reduce the distance between the trays by effecting the separation of gas from the liquid in the inter-tray space; and
(2) improve the efficiency of the mass-transfer process by providing an additional phase contact area above and after the overflow deflector.

This object is attained by that in a mass-transfer apparatus comprising a vertically arranged cylindrical housing separated along the height thereof by a plurality of contact trays provided with overflow passageways, overflow deflectors and alternating perforated and non-perforated sectors adapted to overlie each other in the adjacent trays, according to the invention, arranged to underlie each tray in the space between the perforated and non-perforated sectors are baffles inclined towards the perforated sectors.

Such a construction of the mass-transfer apparatus provides that the inter-tray distance will not depend on the height or thickness of the two-phase layer over the perforated sector, while due to a highly efficient phase separation in the inter-tray space said distance may be reduced to a minimum value determined by the flooding of the overflow passageways.

BRIEF DESCRIPTION OF THE DRAWINGS

The invention will now be described in greater detail with reference to specific embodiments thereof taken in conjunction with the accompanying drawings, in which.

DETAILED DESCRIPTION OF THE INVENTION

Figure 1:
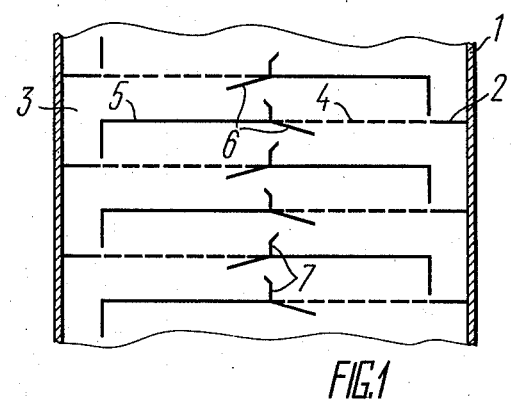
FIG. 1 shows a sectional elevation of a mass-transfer apparatus according to the invention having one perforated sector on each tray.
Figure 2:
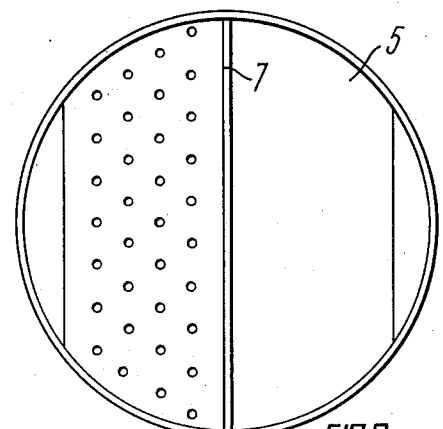
FIG. 2 is a top plan view of the tray having one perforated sector.

With reference to FIGS. 1 and 2, a mass-transfer apparatus according to the invention comprises a cylindrical housing 1 accommodating trays 2 arranged vertically one above the other, the trays 2 being provided with overflow passageways 3. The trays 2 are made up of alternating perforated and non-perforated sectors 4 and 5, respectively, with downwardly inclined baffles 6 interposed therebetween. Provided on the upper face of the tray 2 essentially extending along the borderline between the perforated and non-perforated sectors 4 and 5 is an overflow deflector 7. The trays 2 are secured inside the housing 1 of the apparatus so that each pair of adjacent trays 2 have the respective perforated and non-perforated sectors 4 and 5 thereof arranged in opposed relationship to each other. The mass-transfer apparatus of FIGS. 1 and 2 operates in the following manner.

Figure 3:
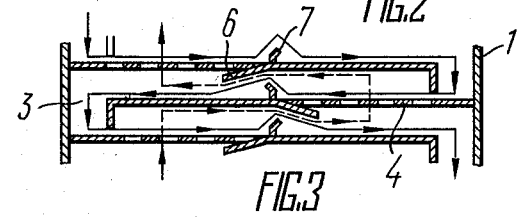
FIG. 3 illustrates the path of travel of liquid and gas through the trays of the mass-transfer apparatus according to the invention.

Liquid delivered onto an underlying tray 2 comes into contact with gas at the perforated sectors 4, whereafter the gas-liquid flow passes through a shaped channel defined by the inclined baffle 6 of the next overlying tray and the overflow deflector 7 of the underlying tray to be thrown against the non-perforated sector 5 of the later tray. The path of liquid flow is indicated by the unbroken line in FIG. 3. The drops of liquid falling onto the non-perforated sector 5 (FIGS. 1 and 2) coagulate and enter the overflow passageway 3, whereas the gas fed to the trays tends to ascend through the perforations of the sector 4 of the overlying tray 2. The path of travel of the gas through the trays 2 of the mass-transfer apparatus is generally indicated in FIG. 3 by the dotted line.

In order to increase the liquid and gas throughput capacity of the apparatus, it has been found expedient to enlarge the perimeter of the overflow and the gas-liquid passage area above the overflow deflectors 7, such improvements being embodied in a modified form of the mass-transfer apparatus as represented in FIGS. 4 and 5 and FIGS. 7 and 8.

Figure 4:
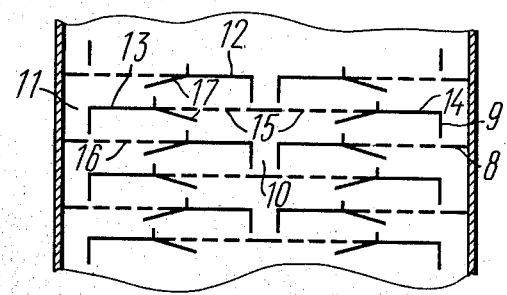
FIG. 4 shows a sectional elevation of another embodiment of the mass-transfer apparatus according to the invention incorporating two perforated sectors per tray.
Figure 5:
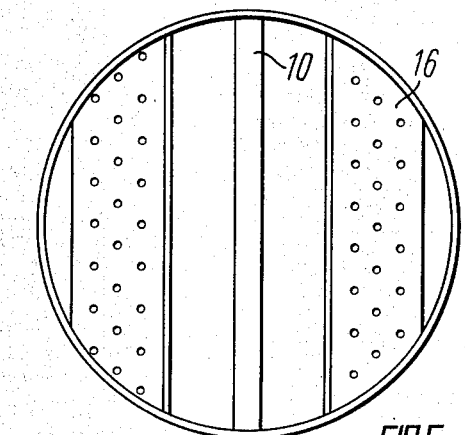
FIG. 5 is a top plan view of the tray having two perforated sectors.

Differing from the embodiment of FIGS. 1 and 2, the neighbouring trays 8 and 9 of the mass-transfer apparatus shown in FIGS. 4 and 5 are provided with unequal numbers of overflow passageways 10 and 11. The overflow passageway 10 of the tray 8 is fashioned generally as a rectangular box arranged to extend along the center of non-perforated sector 12, while two overflow passageways 11 of the tray 9 are positioned at the ends of non-perforated sectors 13 and 14. The trays 8 and 9 are further provided with two perforated sectors 15 and 16 and two inclined baffles 17.

The mass-transfer apparatus of FIGS. 4 and 5 operates as follows.

Figure 6:
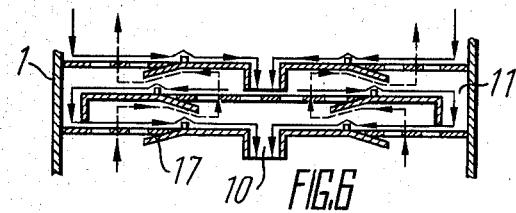
FIG. 6 illustrates the path of travel of liquid and gas through the trays having two perforated sectors.

The flow of liquid entering the central overflow passageway 10 of the tray 8 is divided into two separate flows, each of the latter being conveyed to the perforated sectors 15 to come into contact with the gas passing through the perforations of the tray 9. The inclined baffles 17 of the tray 8 act to direct the gas-liquid flow against the non-perforated sectors 13 and 14 of tray 9. Therewith, the drops of liquid tend to flow along the sectors 13 and 14 into the overflow passageways 11, while the gas ascends through the perforations of the sectors 15 of the overlying tray 8. The paths of travel of the flows of gas and liquid through the trays 8 and 9 of the mass-transfer apparatus are indicated in FIG. 6 by the dotted and unbroken lines, respectively. The trays 8 and 9 of the modification of the embodiment of the mass-transfer apparatus illustrated in FIGS. 4 and 5 are provided with the overflow passageways of larger perimeter and feature a larger area under the inclined baffles 17 for the passage of gas therethrough as compared with the trays 2 of FIGS. 1 and 2, and therefore have a higher gas and liquid throughput capacity.

Figure 7:
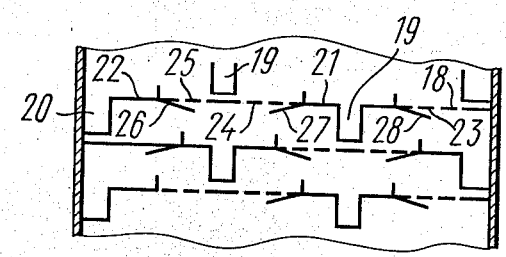
FIG. 7 is a sectional elevation of another modified form of the mass-transfer apparatus according to the invention incorporating three perforated sectors per tray.
Figure 8:
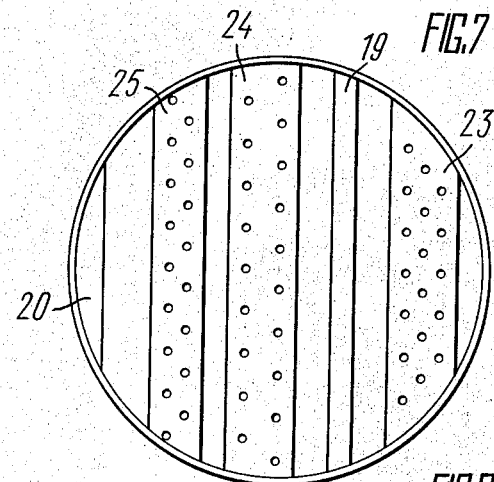
FIG. 8 is a top plan view of the tray having three perforated sectors.

Referring now to FIGS. 7 and 8, there is shown a modification of the mass-transfer apparatus having a still higher capacity. Tray 18 of the mass-transfer apparatus has two overflow passageways, viz. central rectangular passageway 19 and peripheral segment-shaped passageway 20. The overflow passageway 19 is positioned essentially centrally of non-perforated sector 21, whereas the overflow passageway 20 is disposed at the edge of non-perforated sector 22. The tray 18 is provided with three perforated sectors 23, 24 and 25.

Arranged at the borderline between the perforated and non-perforated sectors of the tray 18 are downwardly extending inclined baffles 26, 27 and 28.

The above-described embodiment of the mass-transfer apparatus operates in the following manner.

Figure 9:
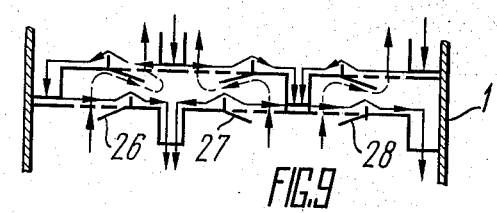
FIG. 9 illustrates the path of travel of liquid and gas through the trays having three perforated sectors.

The entire flow of liquid is supplied simultaneously to the overflow passageways 19 and 20, whereafter the liquid flows from the overflow passageway 20 to enter the perforated sector 23 wherein it is made to come into contact with the gas passing through the perforations thereof. The bubbling of the gas through the liquid acts to form a two-phase flow which is directed by means of the inclined baffle 26 to fall against the non-perforated sector 21, while the liquid which separates from the gas is conveyed through the overflow passageway 19 onto the underlying tray. The liquid exiting from the central overflow passageway 19 is divided into two flows to be conveyed onto the perforated sectors 24 and 25, wherein it is caused to come into contact with the flow of gas passing through the perforations of these sectors. The two-phase flow is separated on the non-perforated sectors 21 and 22, whereupon the gas ascends towards the perforations of the overlying tray, while the liquid flows into the overflow passageways 19 and 20. The path of travel of the flows of gas and liquid is indicated in FIG. 9 by the dotted and unbroken lines, respectively.

The foregoing constructions of mass-transfer apparatus enable, as compared with best types of the similar prior art equipment, a reduction in the height of the inter-tray space to 30–40 mm, whereby the size of the tray-type mass-transfer apparatus is reduced along with an increase in the mass-transfer efficiency of the trays by lowering the amount of liquid entrained by the gas flow and by the formation of an additional phase contact zone in the shaped passage formed by the inclined baffle and at the outlet therefrom.

What is claimed is:

1. Mass-transfer apparatus, comprising:
 a substantially vertically extending housing;
 contact trays accommodated within said housing in vertical overlying relationship with each other, each of said trays including at least one perforated sector and at least one non-perforated sector, said sectors defining a borderline region therebetween, and wherein in a pair of vertically adjacent trays a perforated sector of the upper tray overlies a non-perforated sector of the lower tray and vice versa;
 an overflow passageway provided at a non-perforated sector of each contact tray;
 baffle means extending downwardly from the borderline region between perforated and non-perforated sectors of a tray and inclined towards a perforated sector of that tray; and
 overflow deflector means extending upwardly from the borderline region between perforated and non-perforated sectors of a tray, said overflow deflector means being situated on each tray substantially below a downwardly extending inclined baffle means of the next overlying contact tray.

2. Mass-transfer apparatus, comprising:
 a substantially vertically extending housing;
 a plurality of contact trays situated within said housing one over the other, each of said trays including upper and lower surfaces, at least one perforated sector and at least one non-perforated sector, said sectors defining a borderline region therebetween, said perforated and non-perforated sectors of a tray overlying the non-perforated and perforated sectors respectively of the next underlying tray;

said contact trays including baffle means and overflow deflector means, said baffle means extending downwardly from the lower surface of a contact tray and being inclined towards the perforated sector of that contact tray, and said overflow deflector means extending upwardly from the upper surface of a contact tray and being situated in cooperating relationship with the inclined baffle means extending downwardly from the next overlying contact tray.

3. The combination of claim 2 wherein said baffle means which extend downwardly from a lower surface of a tray extends from the borderline region of that tray and said overflow deflector means which extend upwardly from an upper surface of a tray extends from a borderline region of that tray.

4. The combination of claim 2 wherein said overflow deflector means are situated vertically below the inclined baffle means extending downwardly from the next overlying contact tray.

5. The combination of claim 2 wherein each of said contact trays includes at least two perforated sector and at least two non-perforated sectors defining at least two borderline regions between respective pairs of perforated and non-perforated sectors, and wherein said baffle means include at least two baffle members, each extending downwardly from the lower surface of a contact tray and from a respective one of the borderline regions thereof, and wherein said overflow deflector means include at least two deflector members, each extending upwardly from the upper surface of a contact tray and from a respective one of the borderline regions thereof and situated below a respective one of the inclined baffle members extending downwardly from an overlying contact tray.

* * * * *